US009060247B2

(12) United States Patent
Yang et al.

(10) Patent No.: US 9,060,247 B2
(45) Date of Patent: Jun. 16, 2015

(54) SYSTEM AND METHOD FOR MULTI-RADIO CLOUD COMPUTING FOR LOCATION SENSING

(75) Inventors: Rongzhen Yang, Shanghai (CN); Hujun Yin, Santa Clara, CA (US); Jin Fu, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,953

(22) PCT Filed: Dec. 16, 2011

(86) PCT No.: PCT/US2011/065596
§ 371 (c)(1),
(2), (4) Date: Jun. 27, 2013

(87) PCT Pub. No.: WO2013/089787
PCT Pub. Date: Jun. 20, 2013

(65) Prior Publication Data
US 2013/0281130 A1    Oct. 24, 2013

(51) Int. Cl.
*H04W 4/02*     (2009.01)
*G01S 19/09*    (2010.01)
*G01S 5/00*     (2006.01)

(52) U.S. Cl.
CPC .................. *H04W 4/02* (2013.01); *G01S 19/09* (2013.01); *G01S 5/0036* (2013.01)

(58) Field of Classification Search
CPC ......... G01S 19/09; G01S 5/0036; H04W 4/02
USPC ....................... 455/456.1–456.6, 414.1–141.4
See application file for complete search history.

(56) References Cited

U.S. PATENT DOCUMENTS

| 6,026,304 | A | 2/2000 | Hilsenrath et al. |
| 7,783,621 | B2 | 8/2010 | Cooper |
| 8,559,724 | B2 * | 10/2013 | Choi et al. .................... 382/190 |
| 8,676,623 | B2 * | 3/2014 | Gale et al. .................... 705/7.13 |
| 2008/0226130 | A1 * | 9/2008 | Kansal et al. ................. 382/106 |
| 2011/0059752 | A1 | 3/2011 | Garin et al. |
| 2012/0020320 | A1 * | 1/2012 | Issakov et al. ................ 370/330 |
| 2012/0077521 | A1 * | 3/2012 | Boldyrev et al. .......... 455/456.3 |
| 2012/0282922 | A1 * | 11/2012 | Fodor et al. ................ 455/426.1 |

(Continued)

FOREIGN PATENT DOCUMENTS

KR    10-2004-0069085 A    8/2004

OTHER PUBLICATIONS

International Search Report and Written Opinion, Mailed Date: Sep. 14, 2012, Application No. PCT/US2011/065596, Filed Date: Dec. 16, 2011, pp. 8.

*Primary Examiner* — Khawar Iqbal
(74) *Attorney, Agent, or Firm* — Kacvinsky Daisak Bluni PLLC

(57) ABSTRACT

An apparatus may include a communication interface and a processor circuit. The apparatus may further include a location analyzing module operable on the processor circuit to receive a first set of location information including a first radio information item from a first radio of a first wireless terminal via the communication interface, to scan a second set of location information to identify a second radio information item matching the first radio information item, and to index the second radio information item to a location entry in the second set of location information to determine a refined location for the first wireless terminal. Other embodiments are disclosed and claimed.

19 Claims, 13 Drawing Sheets

(56) References Cited

U.S. PATENT DOCUMENTS

| | | | |
|---|---|---|---|
| 2012/0286997 A1* | 11/2012 | Lin et al. | 342/451 |
| 2012/0290396 A1* | 11/2012 | Petrov | 705/14.64 |
| 2013/0023282 A1* | 1/2013 | Lin et al. | 455/456.1 |
| 2013/0137468 A1* | 5/2013 | Kahle et al. | 455/457 |
| 2013/0143603 A1* | 6/2013 | DiAcetis et al. | 455/456.6 |
| 2013/0163440 A1* | 6/2013 | Issakov et al. | 370/246 |
| 2013/0252649 A1* | 9/2013 | Siomina et al. | 455/466 |
| 2013/0288711 A1* | 10/2013 | Meredith et al. | 455/456.1 |
| 2014/0206385 A1* | 7/2014 | Siomina et al. | 455/456.1 |

* cited by examiner

SYSTEM AND METHOD FOR MULTI-RADIO CLOUD COMPUTING FOR LOCATION SENSING

BACKGROUND

In the present era, location based services (LBS) are increasingly deployed in wireless networks that can be accessed by numerous types of wireless devices, including mobile telephones, smart phones, tablet computers, hybrid communication devices, and other devices. The range of LBSs includes services to identify a location of a person or object, including simply providing a location to the user. Examples of LBS include location-based information such as providing the nearest banking automatic teller machine (ATM) or the whereabouts of a friend or employee; parcel tracking; providing advertising directed at potential customers based on the current customer location; personalized weather services; and location-based games. LBSs are typically provided via a wireless network to which a user of a wireless device may subscribe or connect to as a casual user. Once connected, the current user location may be derived from various types of information.

Common techniques used to determine a wireless device location include global positioning satellites (GPS) locationing and uplink time difference of arrival (u-TDOA or, simply, TDOA). In systems that employ GPS-based locationing, a communications chip within a wireless device receives signals from multiple satellites and uses the received signals to determine location of the wireless device. In TDOA, multiple cell towers, or base stations, receive a signal output by a wireless device. The difference in arrival time of the output signal at the different towers is used to calculate the location of the wireless device. Other techniques include the received signal strength (RSS), which may be measured by either a mobile device or the receiving sensor at a fixed base station. Knowledge of such factors as transmitter output power, cable losses, and antenna gains, as well as the appropriate path loss model, facilitates solving equations for the distance between a wireless device and base station. Variations of RSS include WiFi based RSS and wireless wide area network (WWAN)-based RSS.

Although many different technologies are thus useful for supporting LBS type services, the full benefit of harnessing information from multi-radio terminals for LBS has not yet been realized. Moreover, many wireless terminals may lack certain devices, such as a GPS device, which may render the accuracy of locating the wireless terminal less than optimal.

It is with respect to these and other considerations that the present improvements have been needed.

DETAILED DESCRIPTION

Various embodiments are related to enhancement of locationing of a wireless device (or "wireless terminal"), in particular, a portable wireless device. In some embodiments the wireless terminal may include multiple radios, while in other embodiments the wireless terminal may include a single radio device to be used for locationing. The term "locationing" as used herein refers to the process of finding the location (geographical position) of a device whose whereabouts is generally unknown or subject to change. In a typical scenario consistent with the present embodiments, the wireless terminal may be a portable device, such as a smart phone, personal digital assistant, mobile phone, or tablet computing device.

The wireless terminal may be registered with a network that is operable to provide LBS to the wireless terminal. In various embodiments, the wireless terminal may send a request for LBS, which may be accompanied with at least one item of information indicating the current location (the term "position" or "location" may be used herein interchangeably unless otherwise indicated) of the wireless terminal requesting. For instance, the wireless terminal may forward RSS information (RSSI) that provides the basis to estimate the location of the wireless terminal. In turn, consistent with the present embodiments, an operator receiving the request may use the location information received from the wireless terminal to calculate a refined location of the wireless terminal and return the refined location to the wireless terminal. In various embodiments, the refined location may further serve as the basis to provide better LBS to the user of the wireless terminal.

In various embodiments, the refined location for a wireless terminal may be calculated using network resources, including a pre-existing database of location information relevant to the location indicia received from the requesting wireless terminal. The pre-existing database may include multiple location data for each of multiple locations in a geographical region covered by an operator. As detailed below, such location data may be gathered by the network from multiple wireless terminals, stored, correlated, and updated, to provide the refined location to the requesting wireless terminal. In various embodiments, a network "cloud" may be harnessed to provide a rapid real-time refined location. The network cloud may employ one or more servers to store a database of location data and perform calculations to determine the refined location for a requesting wireless terminal. As illustrated below, an advantage afforded by the present embodiments is that a requesting wireless terminal need not itself have multiple radio devices in order to be provided with accurate and timely LBS services.

Figure 1:
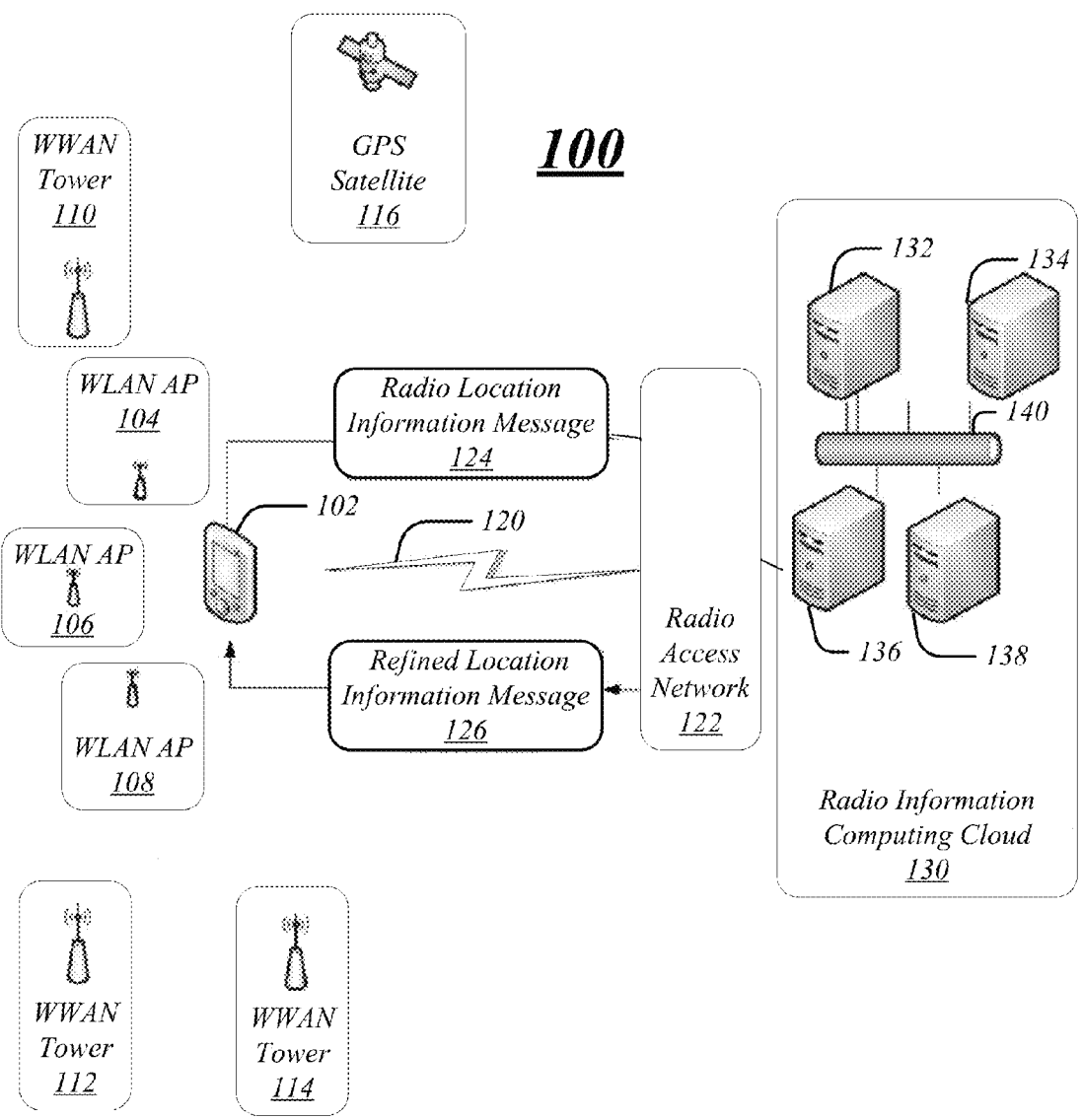
FIG. 1 depicts a system consistent with the present embodiments.

FIG. 1 depicts a system 100 consistent with the present embodiments. As illustrated in FIG. 1, a wireless terminal 102 may interact with various radio resources in the system 100. In various embodiments, the radio resources of the system 100 may be implemented using a wireless local area network (WLAN)-based technology, including WiFi (802.11); Bluetooth; wireless USB; and other known technologies. Some embodiments may additionally be implemented with a radio technology such as global system for mobile communication (GSM), IEEE 802.16 (WiMAX), IEEE 802-20, evolved UTRA (E-UTRA), 3GPP LTE, LTE-A, etc. IEEE 802.16m is an evolution of IEEE 802.16e, and provides backward compatibility with an IEEE 802.16-based system. The UTRA is a component of universal mobile telecommunication system (UMTS), which is a successor technology to GSM. 3rd generation partnership project (3GPP) long term evolution (LTE) is a part of an evolved UMTS (E-UMTS) using the E-UTRA. LTE-advance (LTE-A) is an evolution of the 3GPP LTE. The term "GSM," as used hereinafter with respect to a mobile device or network, may generally refer to a device or network that involves GSM, or a successor technology, such as 3GPP LTE.

As illustrated in FIG. 1, the system 100 may include one or more wireless local area network (WLAN) access points (AP), such as WLAN APs 102, 104, 106. In various embodiments, these APs may be used to provide positioning information regarding a current position of the wireless terminal 102. For example, at a first instance, the RSS may be detected at the wireless terminal 102 from one or more of the WLAN APs 102, 104, and 106. This RSS information may then be collected and reported by the wireless terminal 102 to facilitate calculation of a refined location of the wireless terminal 102 at the given instance, which may be used to provide improved LBS to the wireless terminal 102. After the initial instance, the wireless terminal 102 may travel in a manner that changes the distance between the wireless terminal 102 and WLAN APs 102, 104, and 106. New RSS information may then be collected and reported by the wireless terminal 102 to facilitate calculation of a refined location of the wireless terminal 102 at a second instance, which may be used to provide improved update LBS to the wireless terminal 102, and so forth.

The system 100 also includes multiple wireless base stations, or WWAN towers, 110, 112, 114. In various embodiments, these WWAN towers may also be employed to provide positioning information regarding a current position of the wireless terminal 102. For example, at a first instance, the TDOA may be detected at the wireless terminal 102 using the WWAN towers 110, 112, and 114. This TDOA information may then be collected and reported by the wireless terminal 102 to facilitate calculation of a refined location of the wireless terminal 102 at the first instance, which may be used to provide improved LBS to the wireless terminal 102. After the initial instance, the wireless terminal 102 may change location in a manner that changes the distances between the wireless terminal 102 and WWAN towers 110, 112, and 114. New TDOA information may then be collected and reported by the wireless terminal 102 to facilitate calculation of a refined location of the wireless terminal 102 at a second instance, which may be used to provide improved update LBS to the wireless terminal 102, and so forth.

The system 100 further may include GPS satellites 116 (shown for simplicity as a single object). In various embodiments, these GPS satellites may return GPS calculations of a current position of the wireless terminal 102 at any given instance. This GPS information may then be collected and reported by the wireless terminal 102 to facilitate calculation of a refined location of the wireless terminal 102 at the given instance, which may also be used to provide improved LBS to the wireless terminal 102.

Consistent with various embodiments, the system 100 may process information received from a wireless terminal 102 for various purposes. As illustrated, the wireless terminal 102 may be coupled over a wireless link 120 to a radio access network 122, which may form part of an operator's network (not separately shown) that provides LBS to the user of wireless terminal 102. It is to be noted that some of the aforementioned components of system 100, such as WWAN towers 110, 112, 114 may form part of the radio access network 122. The wireless terminal 102 may provide location information in a radio location information message 124 sent over the wireless link 120 to the radio access network 122. As detailed below, location information provided by a wireless terminal, such as the radio location information message 124 may be used for various purposes by the system 100. In one example, the radio location information message may be forwarded for processing by the operator's network, which may return LBS information including a refined location information message 126. In some embodiments, this refined location information message 126 may include LBS that is based upon a refined determination of the location of wireless terminal 102. In further embodiments, location information in the radio location information message 124 may be forwarded for storage in a database of system 100. This may be useful for the system 100 to improve accuracy of determining location of wireless terminals as discussed below.

As illustrated, the system 100 may include a network, termed a radio information computing cloud 130, which may be a data network that links multiple devices for storing location data and/or computing location information. As illustrated in FIG. 1, the radio information computing cloud 130 may include multiple servers 132, 134, 136, 138, which are linked through a communication link 140, which may be any combination of wired/wireless links. In some embodiments, one or more of the servers from the radio information computing cloud 130 may perform calculations to determine a refined location in real-time of a wireless terminal, such as wireless terminal 102. The calculations may be based in part on information received in the radio location information message 124, as well as other information, such as information pre-stored in a database that contains location information related to the present location of the wireless terminal 102. In various embodiments, the database containing pre-stored location information may be part of a server 132, 134, 136, 138, or may be located in a separate storage device (not shown).

In one example, the wireless terminal 102 may send a request for LBS, which may contain, be contained within, or be sent together with the radio information location message 124. As detailed below, the radio location information message 124 may contain location information for wireless terminal 102 that is not as accurate as desired. For example, the location information received in radio information message 124 may not be sufficiently accurate to reliably provide the wireless terminal 102 with requested LBS, such as a location of a nearest automatic teller machine (ATM). In one scenario, a user may be in a crowded downtown area in which it may be desirable that the user's position is known within about 10 meters, for example, so that ATM locationing can be provided with a desired accuracy. If the information in radio location information message 124 does not meet such accuracy, the radio information computing cloud 120 may determine a refined location of the wireless terminal 102 in order to provide a more accurate LBS response. The determination of a refined location of wireless terminal 102 may be based on comparing location information contained in the radio information location message 124 to pre-stored information in the radio information computing cloud 130. This pre-stored information may include location information based upon multiple radio sources, such as GPS information, WWLAN RSSI, WLAN RSSI, TDOA information, and/or other radio information that is collected prior to the receipt of radio location information message 124. The term "radio information" as used herein, generally refers to items including the type of radio parameters such as the aforementioned radio parameters (GPS information, WWLAN RSSI, WLAN RSSI, TDOA) as well as the measured or estimated value of the radio parameter. The term "location information" refers to information that may include radio information, but also refers to the measured or calculated location that may be associated with radio information. Once the refined location for wireless terminal 102 is determined, this information may be returned in real time as a refined location information message 126, which may contain, be contained within, or be part of the requested LBS, such as a request for an ATM location.

Figure 2:
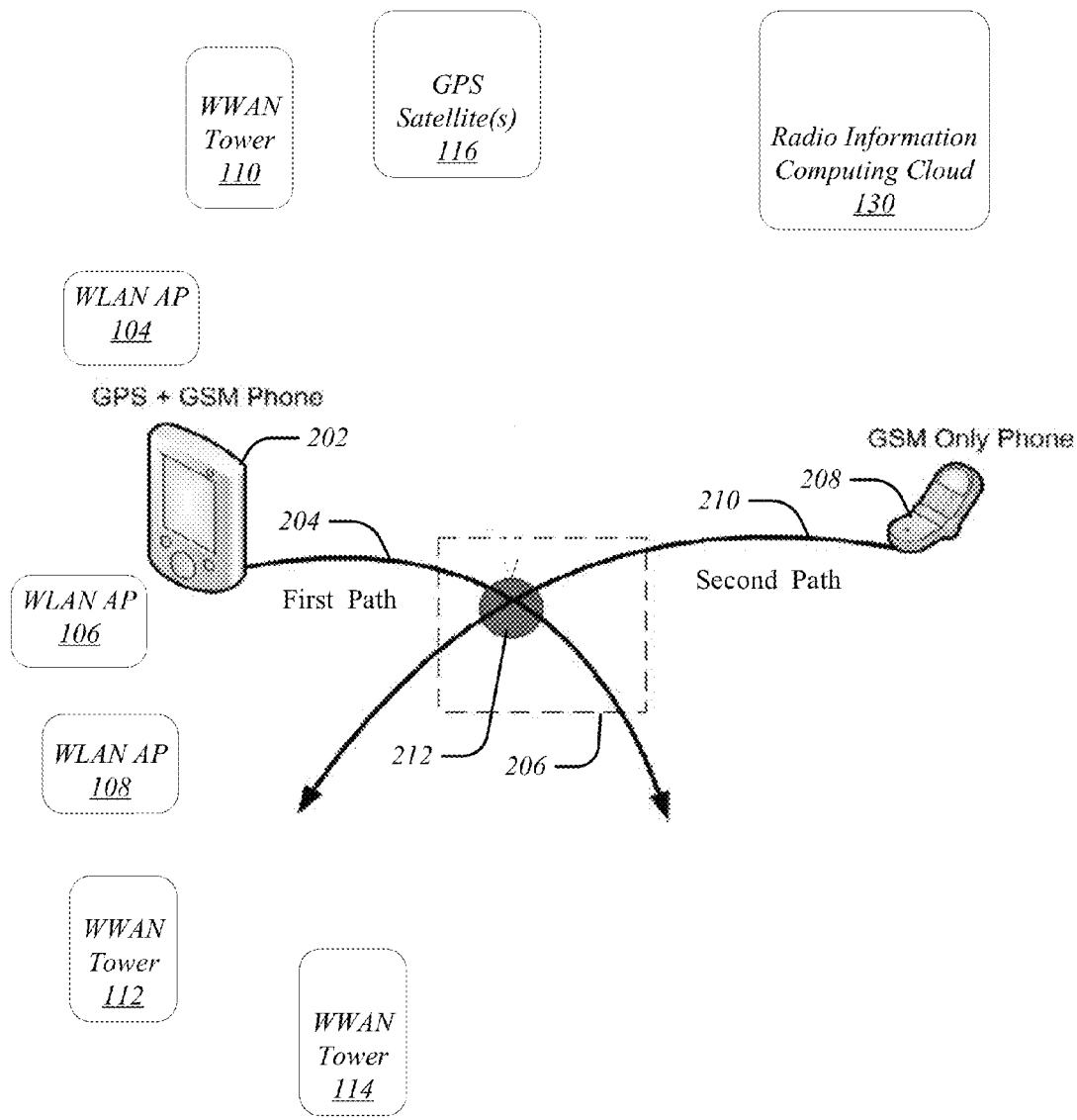
FIG. 2 depicts an embodiment of locationing for a wireless device consistent with various embodiments.

FIG. 2 depicts an embodiment of locationing for a wireless terminal consistent with various embodiments that illustrates how a wireless terminal requesting LBS can harness previous location data received from multiple radio sources. In the scenario depicted in FIG. 2, during a first period of time, a first wireless terminal 202 may be located in a region that allows the wireless terminal 202 to access multiple components of system 100, such as the WWAN towers 110, 112, 114, WLAN APs 104, 106, 108, and the GPS satellites 116. As depicted, the first wireless terminal 202 may contain multiple radio transceivers. For example, the first wireless terminal 202 may be a phone or other communication device that includes a GPS transceiver and a GSM transceiver (not shown), In one example, the first wireless terminal 202 may move along a first path 204 that takes the first wireless terminal 202 through a geographical area 206 that is within the communication range of WWAN towers 110, 112, and 114, which may form part of a GSM network. The geographical area 206 may also be within a communication range of GPS satellites 116. Accordingly, when the first wireless terminal 202 travels through geographical area 206, measurements of the position of first wireless terminal 202 may be performed using the WWAN towers 110-114, or GPS satellites 116. For example, a user of first wireless terminal 202 may desire an LBS-based service, such as locating a nearest ATM. The user may be stationary or may be traveling in a vehicle, for example. Consequently, the user may invoke an application or process (not separately shown) running on first wireless terminal 202, which may trigger a GSM transceiver within first wireless terminal 202 to perform a TDOA measurement using the WWAN towers, 110, 112, and 114. Based on the TDOA measurements, location information for the first wireless terminal 202 can be determined at various points along first path 204, such as points that lie within the geographic area 206. In addition to the TDOA measurements, GPS measurements using a GPS transceiver may be performed while the first wireless terminal 202 travels within geographical area 206. For example, in conjunction with an LBS request for ATM locationing, the first wireless terminal 202 may trigger both TDOA and GPS measurements, which then each may be performed at one or more points along the path 204. Accordingly, data may be collected at a series of point along the path 204 that includes both TDOA and GPS information at the point in question.

Once taken, the TDOA and GPS measurements for first wireless terminal 202 may be forwarded as a location information message(s) to radio information computing cloud 130. This location information may then be used by the system 100 to provide accurate LBS, such as ATM locations proximate the first wireless terminal 202 while located within geographic region 206.

Consistent with various embodiments, such multi-radio measurements of location information for first wireless terminal 202 may also be stored in the system 100. This information may be used to create or enhance a location database that may provide a map of radio data determined by multiple radio techniques as a function of location. In one example, a location database may provide a data structure that corresponds to a two-dimensional matrix of locations. In particular, the data structure may include multiple entries corresponding to various locations within the two dimensional matrix of locations, which may be various locations within geographic region 206. For example, certain entries in the location database may include items of radio information, such as TDOA measurement data, RSSI measurement data, or other radio data. The determination of the location values may itself be based on a technique judged to provide a most accurate location, such as GPS in some cases.

Continuing with the example of FIG. 2, at an instance in time subsequent to that in which first wireless terminal 202 traces the first path 204, a second wireless terminal 208 may enter a geographical area serviced by system 100. In particular, the second wireless terminal 208 may travel along a second path 210, which intersects with the geographical area 206. As illustrated in FIG. 2, the second wireless terminal 208 may be a GSM-capable phone that does not include a GPS transceiver. The user may register second wireless terminal 208 with the system 100 so that the user may access services, such as voice and/or LBS information provided by system 100. In particular, a user of the second wireless terminal 208 may desire a specific LBS, such as ATM locationing. While traveling through the geographical area 206, the user may therefore invoke a locationing application, which triggers TDOA measurements to be performed by system 100 using the WWAN towers 110, 112, and 114 as described above. Once the TDOA measurements are performed, this information may be forwarded to the radio information computing cloud 130.

Consistent with the present embodiments, the system 100 may provide feedback to the second wireless terminal 208 that includes a refined location information message, as also discussed above. The refined location information message may contain GSM information that corresponds to the TDOA measurements forwarded to system 100 by the second wireless terminal 208. Referring once more to FIG. 1, in one example, the radio information computing cloud 130 may compare TDOA information previously stored in its database to the TDOA measurements just received from the second wireless terminal 208. As noted, such a database may include a data structure or map in which multiple locations within a matrix of locations each include one or more items or radio information, such as a TDOA, RSSI, or other radio measurement. In one example of a data structure, multiple locations within the geographical area 206 are each associated with a respective TDOA measurement value, where each location value, that is, the two-dimensional coordinate of the location, is determined based upon GPS measurements. The stored TDOA measurement values corresponding to the multiple locations in geographical area 206 may based upon the aforementioned radio measurements taken by first wireless terminal 202 and/or other wireless terminals that travel within the geographical area 206.

The radio information computing cloud 130 may therefore interrogate a database having entries corresponding to the geographical area 206 to identify a TDOA measurement having a measurement value that substantially matches the measurement received from second wireless terminal 208. The term "substantially matches" may refer to an exact match when a value of a database entry, such as a TDOA value, is identical to the measurement value. The term "substantially match" may also refer to a case in which a value of an entry in a database is closer to the measurement value than that of any other values of other entries of the database. Thus, a substantial match may refer to a database value that is an identical match or a value that most closely matches that of the measurement received from a wireless terminal when no identical match to the measurement value exists in the database. After identifying the TDOA entry in its database that provides the closest TDOA match, the radio information computing cloud 130 may correlate the TDOA entry to its associated location in the database, which may be determined by GPS measurement. The radio information computing cloud 130 may then return the GPS-based location to the second wireless terminal 208. The GPS information may also be used to provide the most accurate ATM locationing for second wireless terminal 208.

In the above manner, a wireless terminal that lacks certain locationing capability, such as GPS capability, may nevertheless be effectively provided with such capability by communicating with the system 100. In addition, databases within the system 100 may be constantly improved by collecting single and multiple radio information, as illustrated in FIG. 2.

Figure 3A:
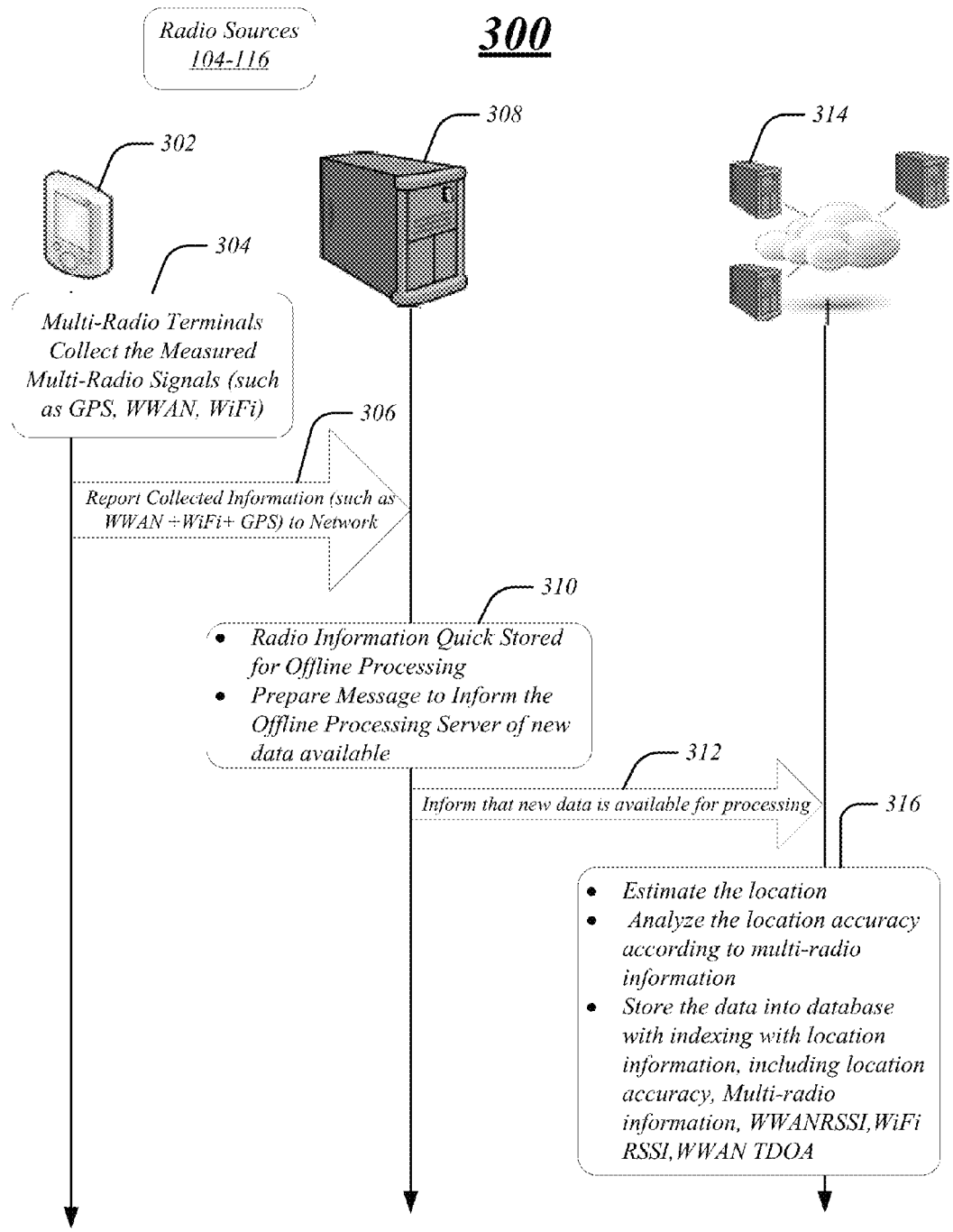
FIG. 3a depicts details of operation of exemplary elements of a system consistent with the present embodiments.

FIG. 3a depicts details of operation of exemplary elements of a system 300 consistent with the present embodiments. The scenario illustrated in FIG. 3 generally depicts a circumstance in which radio information created by a multi-radio wireless terminal is reported to a network, which may use the radio information to create or enhance a location database and thereby improve locationing capability. It is to be noted that the collecting network may or may not return locationing information to the reporting multi-radio device after receiving the radio information. As illustrated in FIG. 3a, when a multi-radio terminal (device) 302 is within a communications range of radio sources 104-116, such as GPS satellites, WWAN towers, and WiFi APs, the multi-radio terminal may measure radio signals corresponding to the various radio capabilities of the multi-radio terminal 302. These measured radio signals may be collected as a packet of information 304, which is then forwarded by the multi-radio terminal 302 as a report 306 to a network. In some embodiments, the radio signal information collection can be done at an application level, or may be performed in provisioned firmware by carriers.

In some embodiments, the multi-radio terminal 302 may wirelessly transmit the report 306 over a data link to a WWAN tower (via a 3G or 4G link) or WLAN access point (via a WiFi link, for example). The receiving WWAN or WLAN entity may be linked to a data network of a provider that includes a backend support server 308, which receives the report 306 to perform initial processing tasks 310 that are based upon the radio information contained in the report 306. For example, the processing tasks 310 may include quick storing of the received radio information by the backend support server 308 for subsequent offline processing by a cloud server.

In some embodiments, initial processing tasks 310 may also include preparing an alert that new location data is available for offline processing. Subsequently, a message 312 may be sent to a backend cloud computing server 314 that includes an alert of new location information for offline processing and may also contain the new location information. Consistent with the present embodiments, the backend cloud computing server 314 may be arranged to perform various tasks including processing of new location information received from a wireless terminal, storing location information, and providing location information to a requesting device. Although depicted as separate entities in the figures, in some embodiments the backend support server 308 and backend cloud computing server 314 may be the same server.

Figure 3B:
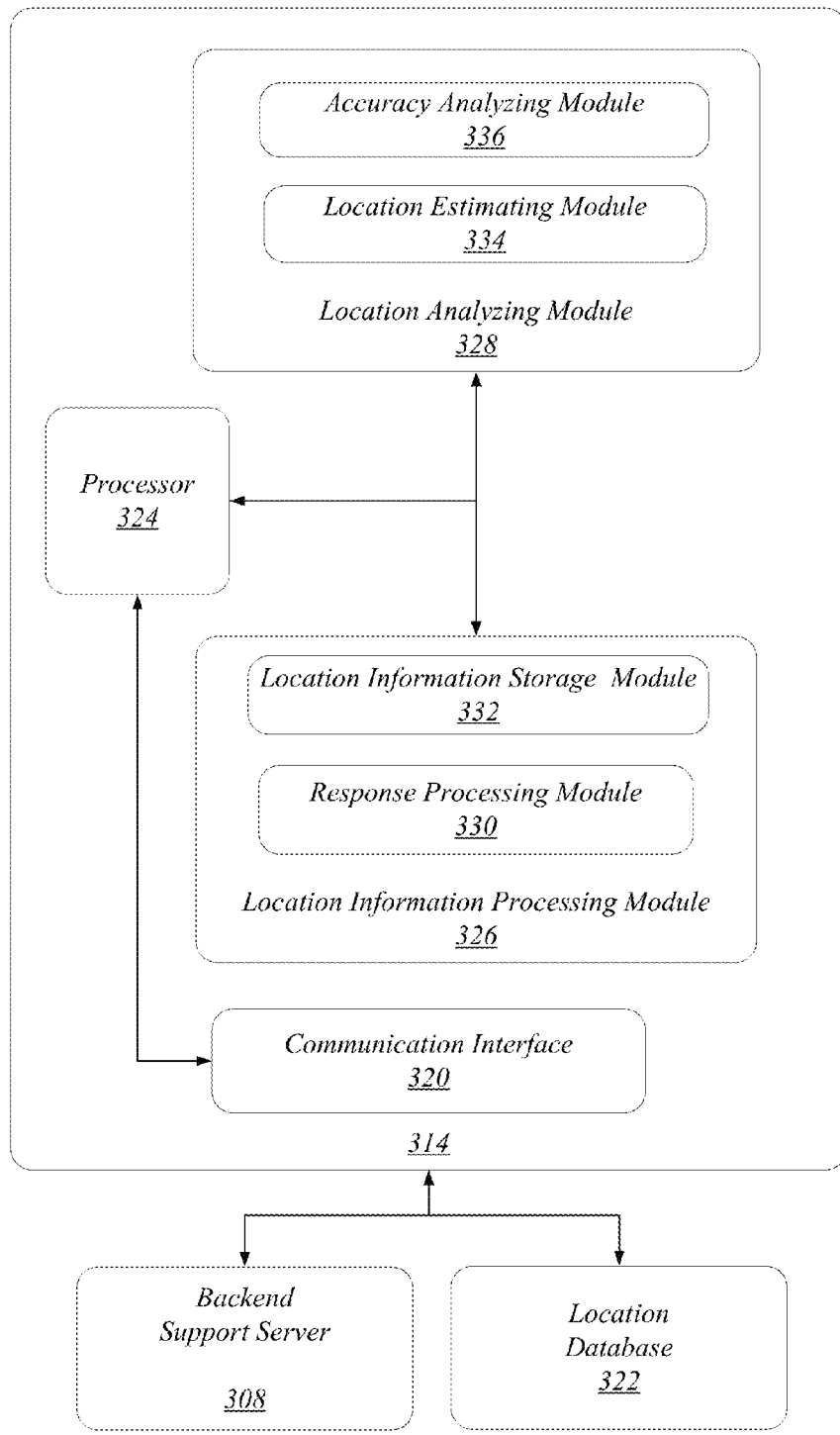
FIG. 3b depicts details of computing server consistent with various embodiments.

FIG. 3b depicts details of backend cloud computing server 314 consistent with various embodiments. The backend cloud computing server 314 may include a communication interface 320, which may be coupled to the backend support server 308 and to a location database 322. The backend cloud computing server 314 may include a processor 324 coupled to the communication interface 320, as well as a location information processing module 326 and location analyzing module 328, whose operation is detailed with respect to the FIGs. to follow. In brief, the location information processing module 326 may include a response processing module 330 and location information storage module 332. The response processing module 330 may determine the nature of an incoming message containing location information, and may determine appropriate actions to perform, such as whether to analyze and/or store new location information, and whether to provide location information in response to an incoming message. For example, if the incoming message containing location information is associated with a request for location information, the response processing module 330 may provide a refined location for return to the requesting wireless terminal. On the other hand, if the incoming message containing location information is not associated with a request for location information, the response processing module 330 may determine that the location information is to be stored. The response processing module 330 may also determine whether an incoming message includes a request for location based services. If LBS is to be provided in response to the incoming message, the response processing module may retrieve the appropriate LBS based upon a determination of the location of a requesting wireless terminal, as detailed below.

The location information storage module 332 may perform such tasks as storing information to the location database 322, which may involve determining a position within the location database 322 to store location information. The location information storage module 332 may also retrieve information from the location database 322, for example, in response to an incoming request, as detailed below.

The location analyzing module 328 may include a location estimating module 334 and accuracy analyzing module 336. In the present embodiments, the operation of a location estimating module involves estimating the location of a wireless terminal based upon various items of location information and is further discussed with respect to FIGS. 3a-10 and appurtenant text to follow. The accuracy analyzing module 336 may determine the accuracy of a particular location estimate as also set forth in more detail below.

Returning again to FIG. 3a, after receiving the new location information from backend support server 308, the backend cloud computing server 314 may perform various operations 316. These operations may include estimating the location of the reporting device associated with the radio information which may be received in message 312. Consistent with various embodiments, the backend cloud computing server 314 may estimate the location for the received radio information (that is, the location of the multi-radio terminal 302) by processing data from the radio of multi-radio terminal 302 that employs the most accurate technique for measuring position. For example, the backend cloud computing server 314 may inspect the message 312 and determine that radio information contained therein includes GPS information and WWAN RSSI information. The backend cloud computing server 314 may then select the GPS information as the most reliable and estimate the location of the reporting multi-radio terminal 302 based upon the GPS information. If the message 312 does not include GPS data, the backend cloud computing server 314 may select the radio source deemed to provide the most accurate location information from among the multiple radio sources for which data is reported in the message 312, such as, such as WWAN RSSI data, WWAN TDOA data or WiFi RSSI data.

In addition to estimating the location of the source of the radio information, the backend cloud computing server 314 may determine the accuracy of the location determination. For example, if the location determination is based upon GPS information, it may be assigned a high degree of accuracy.

Once the location of a source of radio information is determined (estimated), the values of radio parameters of the received radio information, such as WWAN RSSI, WiFi RSSI, WWAN TDOA, and GPS signal may be stored by the backend cloud computing server and indexed to the determined location of the multi-radio terminal 302. Thus, a set of correlated data may be entered into the database including, for each of multiple locations, the estimated location and the location accuracy, together with values of radio parameters derived from the radio techniques used to perform measurements at the estimated location. If parameters such as location accuracy and/or radio parameters are already present in the database for a given location, the new values of the parameters (RSSI, TDOA, etc.) received from the multi-radio terminal 302 may be added to pre-existing radio information for that location and/or used to refine the values of the parameters stored for that location.

Figure 4:
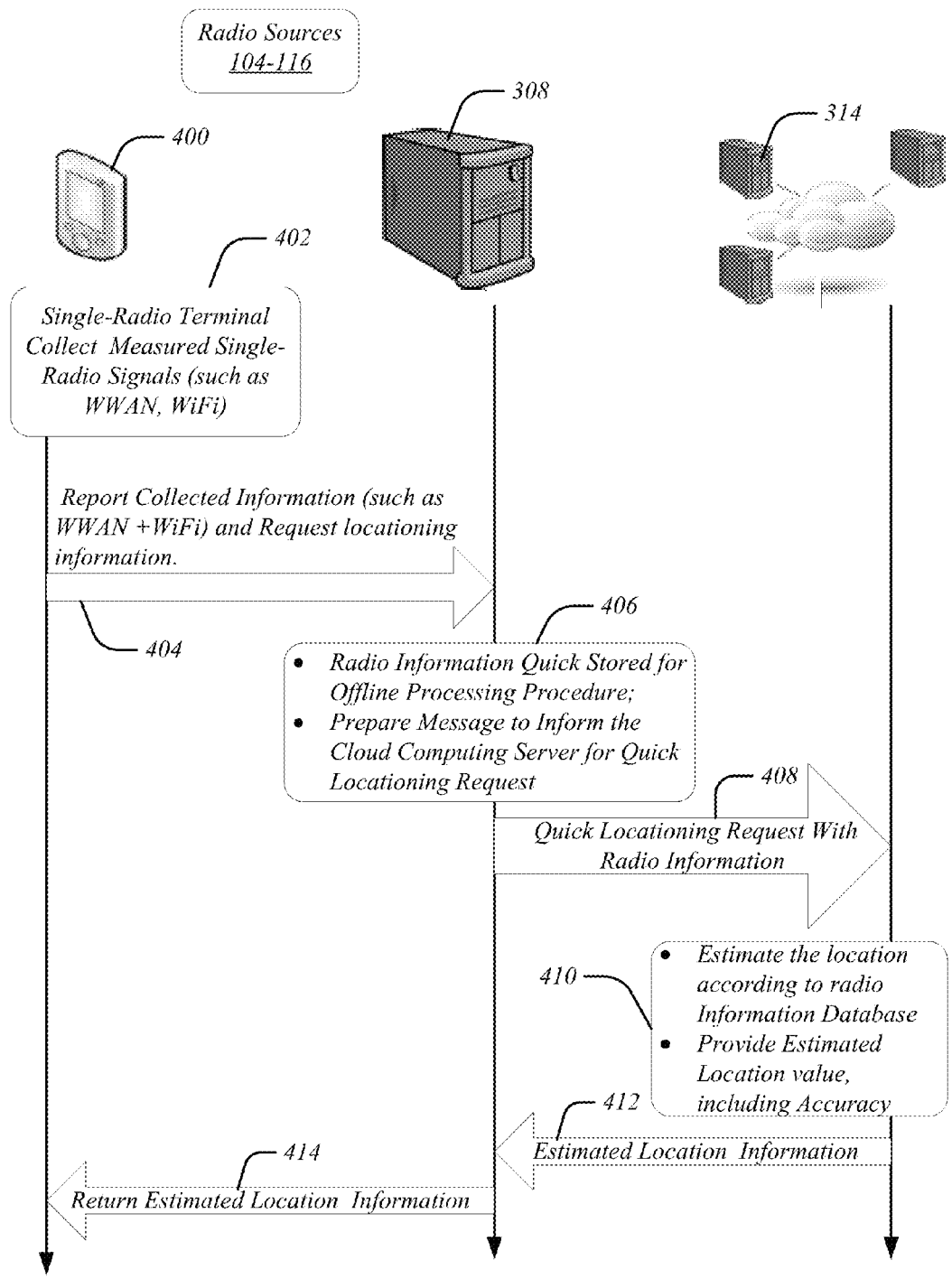
FIG. 4 depicts details of further operations of the system of FIG. 3 consistent with various embodiments.

FIG. 4 depicts details of further operations of the system 300 of FIG. 3 consistent with various embodiments. The scenario illustrated in FIG. 4 generally depicts a circumstance in which a single-radio device 402 seeks location information. The single-radio device 402 may measure radio information and report the radio information to a network, which may use the radio information to provide immediate location information to the single-radio device 402. The radio information may also be used to enhance a location database and thereby improve locationing capability of the network. As illustrated in FIG. 4, when the single-radio terminal (device) 400 is within a communications range of radio sources 104-116, such as WWAN towers, and WiFi APs, the single-radio terminal 400 may perform a set of tasks 402, including measuring radio signals corresponding to the radio capability of the single-radio terminal 400. Typically, this measured radio signal may be a WWAN signal and may be collected as a packet of radio information. The collected radio information may be forwarded by the single-radio terminal 400 in a report 404 to a backend support server 308. In the scenario of FIG. 4, the report 404 also includes a request for locationing information. For example, a user of the multi-radio terminal 400 may forward the report 404 to obtain LBS information, such as the location of a nearest bookstore.

Upon receiving the report 404, the backend support server 308 may perform various tasks 406. The backend support server may quick store the radio information in report 404, and may also prepare a request message to retrieve the locationing information requested by the single-radio terminal 400. A locationing request message 408 may then be sent to the backend cloud computing server 314. The locationing request message may include or be accompanied by the radio information received from the single-radio terminal 400.

When the backend cloud computing server 314 receives the locationing request message 408, a series of operations 410 may be performed. The cloud computing server 314 may provide a refined location estimate of the single-radio terminal 400 as requested. One component of performing the refined location estimate may be determining the most reliable radio information received from the multi-radio terminal. Thus, since the radio information provided in the request message 408 does not include GPS information, another source, such as RSSI or TDOA information, may be used to estimate the location of the single-radio terminal 400. For example, a value of WWAN RSSI received in the request message 408 may be compared to WWAN RSSI entries stored entry in a location database maintained by the radio information computing cloud the cloud.

Figure 5:
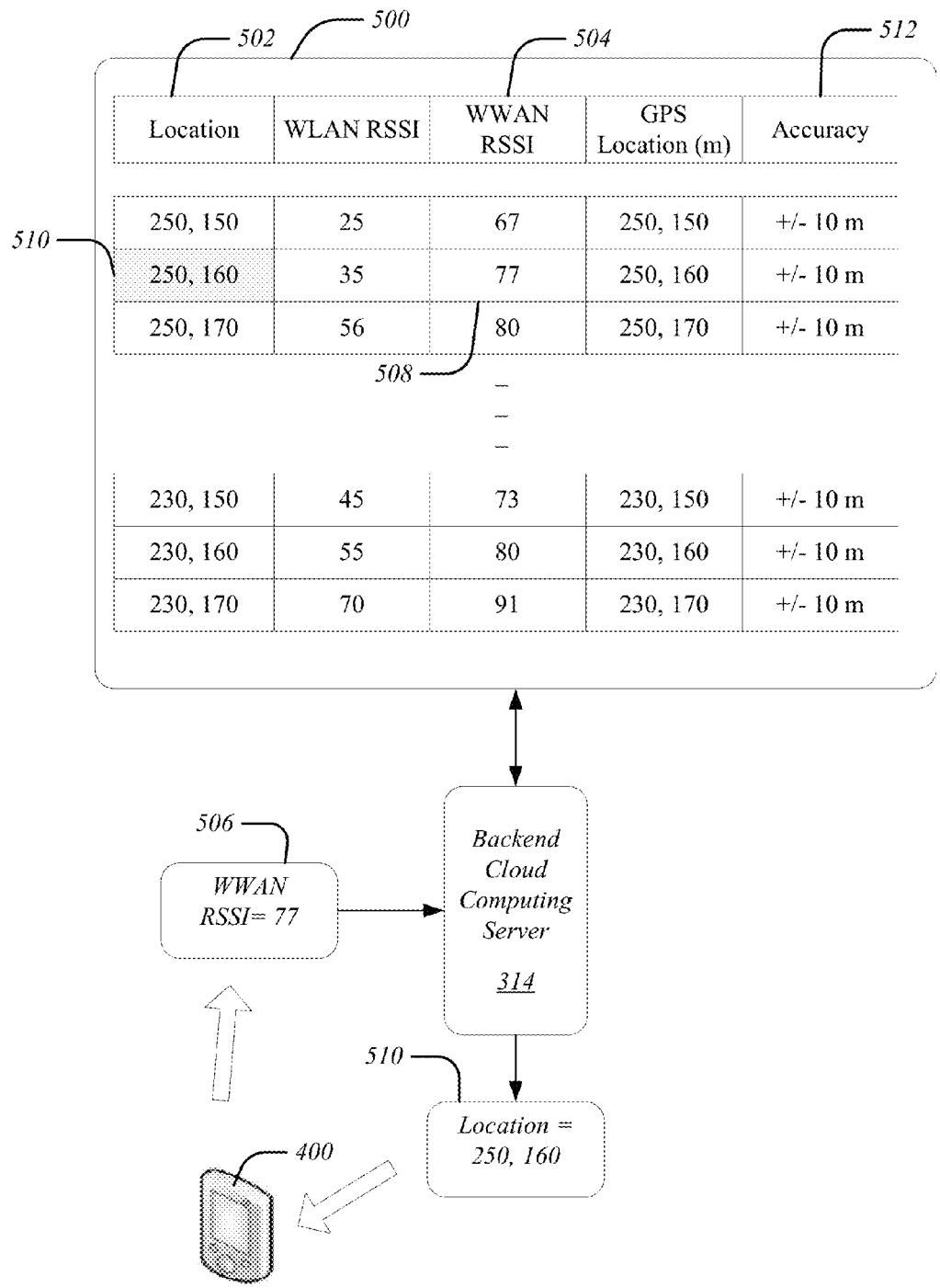
FIG. 5 depicts an example of a location database that may be used to determine location information for a requesting wireless device.

FIG. 5 depicts an example of a location database 500 that may be used to determine location information for a requesting wireless terminal. The location database 500 may be populated by multiple radio measurements, such as those described above with respect to FIGS. 1-3. As illustrated, the location database 500 includes radio information including WWAN RSSI, WLAN RSSI, and GPS entries, which are indexed to location entries 502 indicative of the locations from which the radio information is retrieved. In other words, each row of database 500 is characterized by a different location entry 502, where each row contains multiple radio information items (entries) distributed over multiple columns, in which each column represents a different radio parameter. For simplicity, the location entries 502 are shown to be the same as the GPS determined values, reflecting the case where GPS information is reported together with other radio information, and is deemed to be a reliable indication of location.

Consistent with various embodiments, the values of radio parameters listed in database 500 may represent the average value of a radio parameter or some other measure of central tendency that takes into account multiple individual radio measurements for a given location 502. Thus, one or more of the WWAN RSSI entries 504 may represent the mean of multiple measurements for one or more different locations 502. These measurements may be reported by multiple different wireless terminals, which may be multi-radio devices, as discussed above with respect to FIGS. 3$a$, 3$b$.

As illustrated in the scenario of FIG. 5, the single-radio wireless terminal 400 reports a WLAN RSSI value of 77 in a data packet 506, which may be included in a request message 408 (see FIG. 4). The backend cloud computing server 314 may then employ a location analyzing module (see location analyzing module 328) to scan the location database 500 for a WWAN RSSI stored entry providing the best match to the WWAN RSSI received in the data packet 506. As illustrated, the location database contains a WWAN RSSI entry 508 having a value of 77, which is an exact match to the value reported by the single-radio wireless terminal 400. The backend cloud computing server may then retrieve the location entry 510 of location database 500 that corresponds to the RSSI entry 508, as shown in FIG. 5. This location entry 510 may then be returned as a refined location estimate to the single-radio terminal 400.

Figure 6:
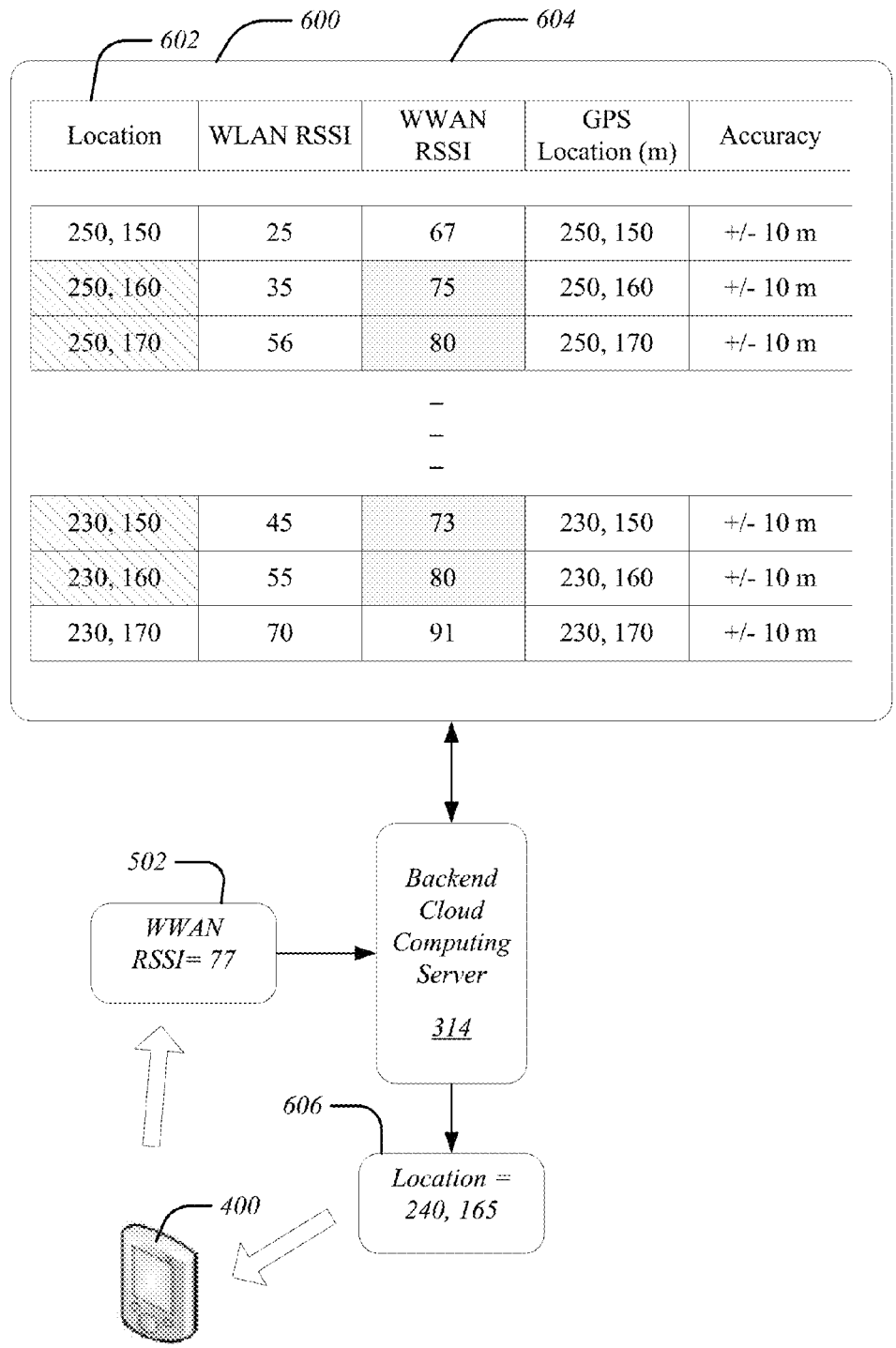
FIG. 6 depicts another example of a location database that may be used to determine location information according to other embodiments.

In other embodiments, the backend cloud computing server may perform additional operations to determine a refined location estimate. FIG. 6 depicts another example of a location database 600 that may be used to determine location information according to other embodiments. In the database 600, the WWAN RSSI entries differ slightly from those depicted in FIG. 5. In the scenario of FIG. 6, none of the WWAN RSSI entries 604 provides an exact match to the WWAN RSSI value of data packet 502 received from the single-radio terminal 400. In this case, the difference between the WWAN RSSI value of data packet 502 and four different WWAN RSSI entries (shaded) is four or less. Consistent with the present embodiments, the backend cloud computing server 314 may identify one or more WWAN RSSI entries 604 providing the closest match to the WWAN RSSI value of data packet 502 in order to determine a refined location estimate. The backend cloud computing server 314 may employ any appropriate technique to produce a refined location estimate based upon the WWAN RSSI entries 604, including interpolation of entries providing nearest matches. In one example, as shown in FIG. 6, the backend cloud computing server 314 may select the four different location entries 602 (hatched) that correspond to the respective four WWAN RSSI entries providing the closest match to the WWAN RSSI value of data packet 502. The refined location estimate may then be calculated by interpolating the selected location entries to produce a refined location estimate, or may apply another procedure to treat the selected entries 602 to yield the refined location estimate 606.

The backend cloud computing server 314 may also perform an estimation of the accuracy of the refined location estimate and provide this estimate for return to the single-radio terminal 400. In the example of FIG. 5 the location database 500 includes accuracy values 512 corresponding to the location values 510. In some embodiments, these accuracy values may serve as the basis for providing estimates of the accuracy of the refined location estimate returned to the single radio terminal 400.

Returning to FIG. 4, a refined location estimate message 412, which may include a refined location estimate and location accuracy, may be returned from the backend cloud computing server 306 to the backend support server 304. The backend support server 308 may in turn send a refined location estimate message 414 to the requesting single-radio terminal 400. The refined location estimate may therefore provide the single-radio terminal 400 with more accurate location information than possible if only the WWAN capability of the single radio terminal 400 were employed to determine location. In various embodiments, the refined location estimate message 414 may include LBS information, such as the location of an ATM, bank, store, business, landmark, or other service. In some embodiments, the backend cloud computing server 314 may retrieve location based service information based upon the calculated refined location estimate. For example, the backend cloud computing server 314 may search a service database (not shown), which may be located in any convenient part of a cloud computing system, such as radio information computing cloud 130. The appropriate item of LBS information may then be selected based identifying a service location of a requested service that is listed in the service database and most closely matches the refined location estimate. For example, in response to a location request message 408 containing a request for ATM location, the backend cloud computing server 314 may identify a closest ATM to the location specified by the refined location estimate. The information identifying the closest ATM may then be forwarded to the requesting wireless terminal in the refined location estimate message 414.

Figure 7:
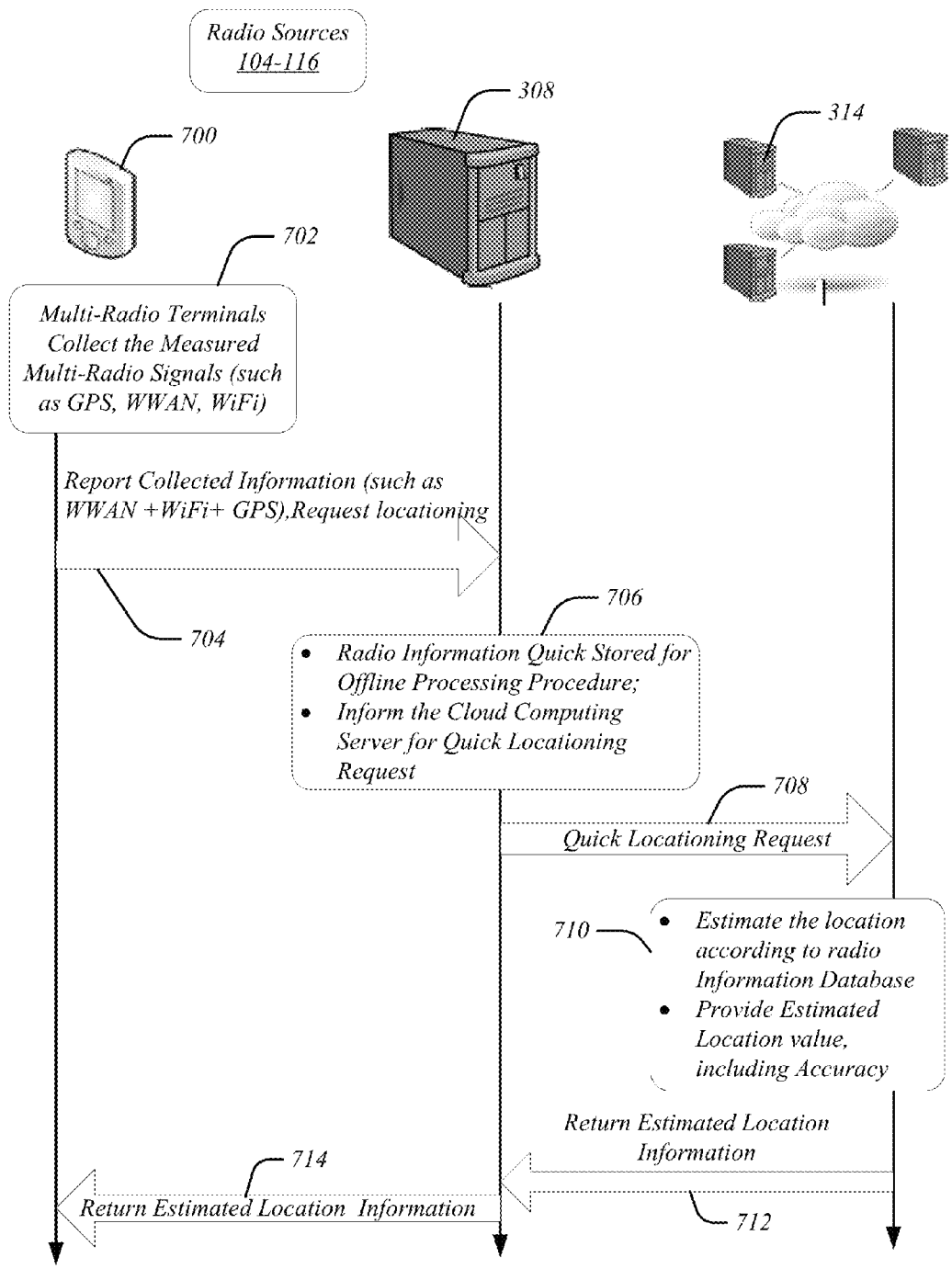
FIG. 7 depicts details of further operations of the system of FIG. 3 consistent with additional embodiments.

FIG. 7 depicts details of further operations of the system 300 of FIG. 3 consistent with the present embodiments. The scenario illustrated in FIG. 7 generally depicts a circumstance in which radio information created by a multi-radio wireless terminal 700 is reported to a network, which may use the radio information to provide immediate location information to the multi-radio device. The radio information may also be used to enhance a location database and thereby improve locationing capability. As illustrated in FIG. 7, when the multi-radio terminal (device) 700 is within a communications range of radio sources 300, such as GPS satellites, WWAN towers, and WiFi APs, the multi-radio terminal may perform various tasks 702 such as measuring radio signals corresponding to the various radio capabilities of the multi-radio terminal 700. These measured radio signals may be collected as a packet of radio information, which is then forwarded by the multi-radio terminal 700 in a report 704 to a backend support server 304. In the scenario of FIG. 7, the report 704 also includes a request for locationing information. For example, a user of the multi-radio terminal 700 may forward the report 704 to obtain LBS information, such as the location of a nearest bookstore.

Upon receiving the report 704, the backend support server 308 may perform various tasks 706. The backend support server may quick store the radio information in report 704, and may also prepare a request message to retrieve the locationing information requested by the multi-radio terminal 700. A location request message 708 may then be sent to the backend cloud computing server 314. The locationing request message may include or be accompanied by the radio information received from the multi-radio terminal 700.

When the backend cloud computing server 314 receives the location request message 708, a series of operations 710 may be performed. The backend cloud computing server 314 may provide a refined estimate of the location of the multi-radio terminal 700 as requested. One component of performing the refined estimate of location may be determining the most reliable radio information received from the multi-radio terminal. Thus, if the radio information provided in the location request message 708 does not include GPS information, another source, such as RSSI or TDOA information, may be used to estimate the location of the multi-radio terminal 700. For example, a value of WWAN RSSI received in the location request message 708 may be matched to a value of a WWAN RSSI stored entry in the database to determine a best match. The backend cloud computing server 314 may then scan the database for a GPS-determined location corresponding to the WWAN RSSI stored entry providing the best match to the WWAN RSSI received in the request message 708. This location may then be returned as a refined location estimate to the multi-radio terminal 700.

If the location request message 708 does include GPS information, the backend cloud computing server 314 may used the GPS information to provide an initial estimate of the location of multi-radio terminal 700. The backend cloud computing server 314 may use other radio information received in the request message 708 to refine the initial GPS-based location determination. For example, the WWAN RSSI values received in location request message 708 may be compared to corresponding WWAN RSSI entries stored in the database for the given location determined from the GPS information. If necessary, the backend cloud computing server 306 may modify the initial estimate according to how closely the WWAN RSSI values match one another. This location may then be returned as a refined location estimate to the multi-radio terminal 700.

The backend cloud computing server 306 may also perform an estimation of the accuracy of the refined location estimate and provide this estimate for return to the multi-radio terminal 700. As illustrated in FIG. 7, a refined location estimate message 712 may be returned from the backend cloud computing server 314 to the backend support server 308. The backend support server 308 may in turn send a refined location estimate message 714 to the requesting multi-radio terminal 700. The refined location estimate may therefore provide the multi-radio terminal 700 with more accurate location information even through the multi-radio terminal 700 may have GPS capability, for example.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
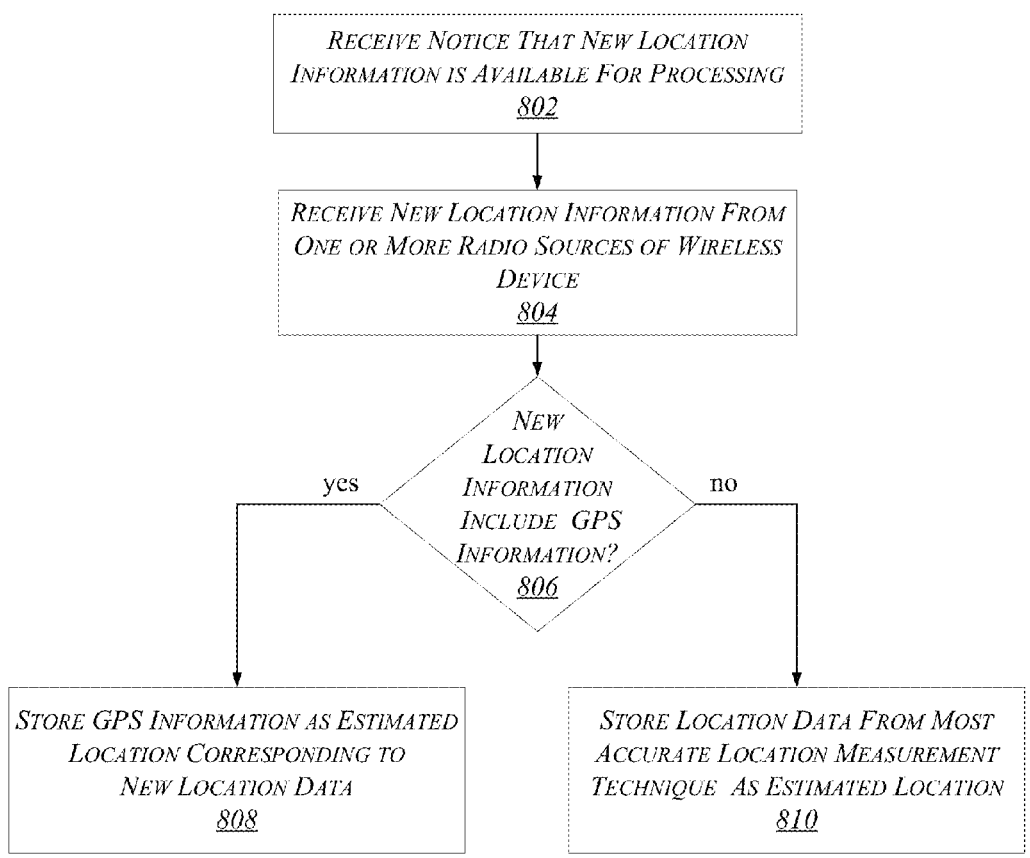
FIG. 8 depicts one exemplary logic flow.

FIG. 8 depicts one exemplary logic flow 800. At block 802, a notice is received that new location data is available for processing. At block 804, new location information, such as radio information from one or more radio sources is received. At block 804 a determination is made as to whether the location information includes GPS-based location information. If so, the flow moves to block 808, where the GPS-based location estimate is stored.

If no GPS-based information is included in the location information, the flow moves to block 810. At block 810, location data from most accurate location estimation technique is stored as the estimated location.

Figure 9:
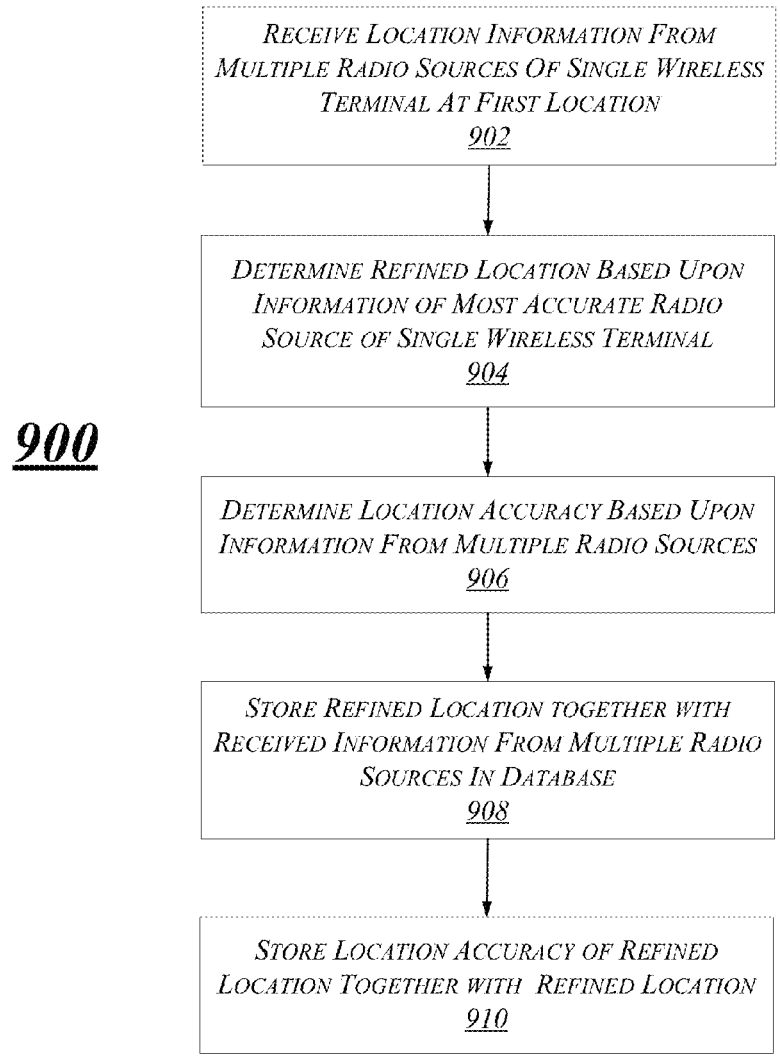
FIG. 9 depicts a further exemplary logic flow.

FIG. 9 depicts another exemplary logic flow 900. At block 902, location information is received from multiple radio sources of a single wireless terminal positioned at a first location. At block 904, the refined location for the wireless terminal is determined based upon information from the most accurate radio source. At block 906, the location accuracy is determined based upon information from multiple radio sources. At block 908, the refined location is stored together with the received radio information from multiple radio sources corresponding to the first location. At block 908, the location accuracy of the refined location is stored together with the refined location.

Figure 10:
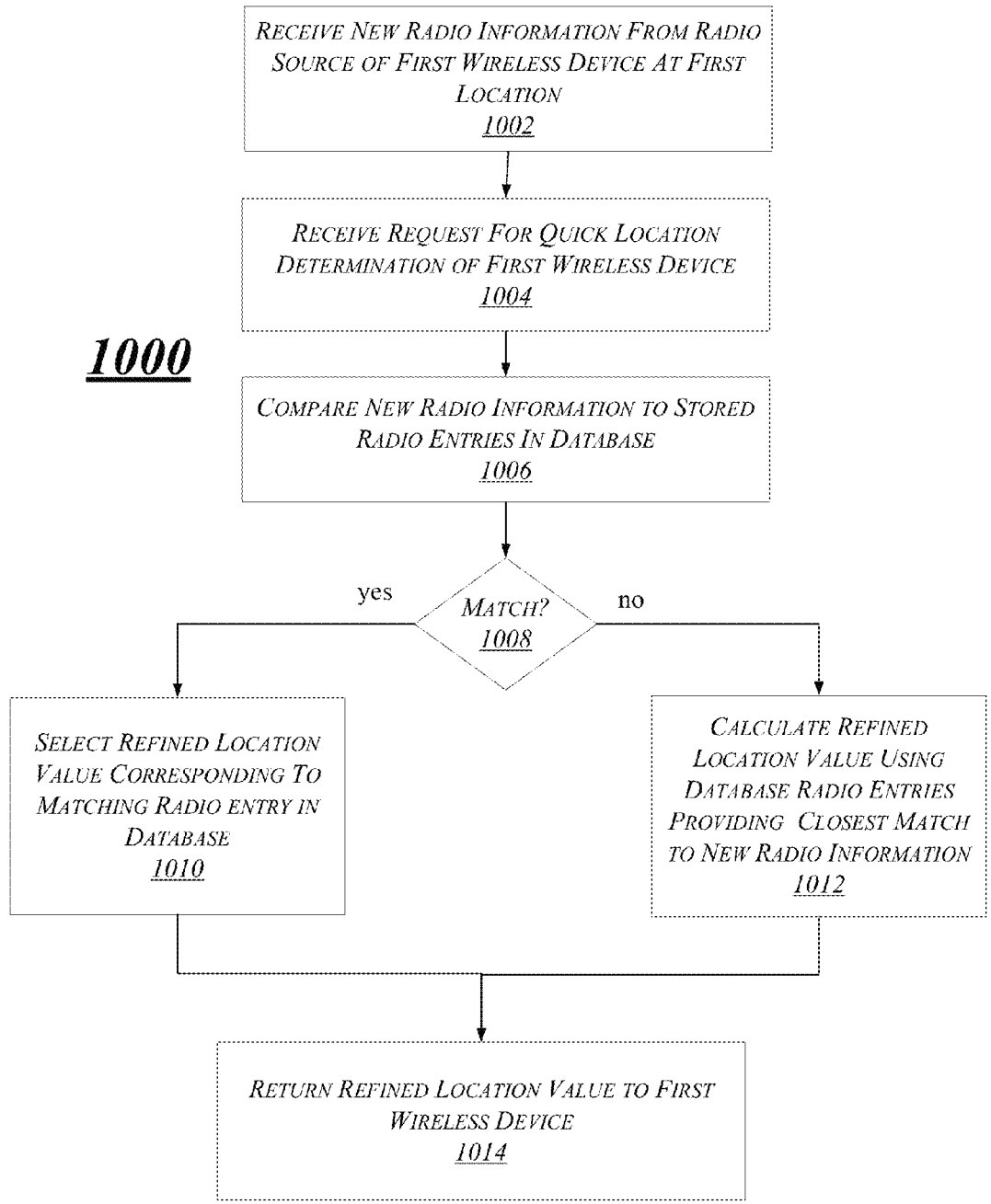
FIG. 10 depicts another exemplary logic flow.
Figure 11:
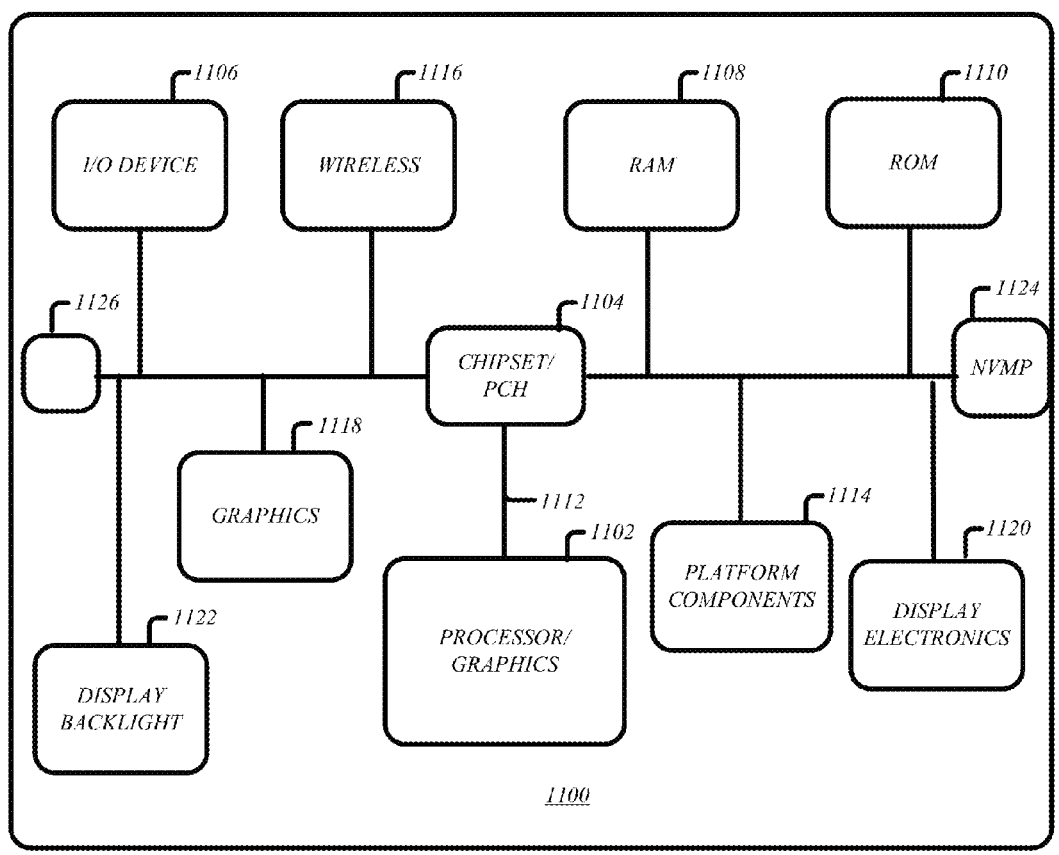
FIG. 11 depicts an embodiment of a computing system.

FIG. 10 depicts another exemplary logic flow 1000. At block 1002, new radio information is received from a radio source of a first wireless terminal at a first location. At block 1004, a request for quick location determination is received from the first wireless terminal. At block 1006 the new radio information is compared to stored radio information in a database. At block 1008 it is determined whether a match exists between the new radio information and entries in the database. If so, the flow moves to block 1010. At block 1010, a refined location value is selected that corresponds to the radio information entry in the database whose value matches the new radio information. If no match is found at block 1008, the flow moves to block 1012. At block 1012, a refined location value is calculated using database radio entries that provide the closest match to the new radio information. The flow then moves to block 1014, where the refined location value is returned to the first wireless terminal FIG. 11 is a diagram of an exemplary system embodiment and in particular, FIG. 11 is a diagram showing a platform 1100, which may include various elements. For instance, FIG. 11 shows that platform (system) 1110 may include a processor/graphics core 1102, a chipset/platform control hub (PCH) 1104, an input/output (I/O) device 1106, a random access memory (RAM) (such as dynamic RAM (DRAM)) 1108, and a read only memory (ROM) 1110, display electronics 1120, display backlight 1122, and various other platform components 1114 (e.g., a fan, a crossflow blower, a heat sink, DTM system, cooling system, housing, vents, and so forth). System 1100 may also include wireless communications chip 616 and graphics device 1118. The embodiments, however, are not limited to these elements.

As shown in FIG. 11, I/O device 1106, RAM 1108, and ROM 1110 are coupled to processor 1102 by way of chipset 1104. Chipset 1104 may be coupled to processor 1102 by a bus 1112. Accordingly, bus 1112 may include multiple lines.

Processor 1102 may be a central processing unit comprising one or more processor cores and may include any number of processors having any number of processor cores. The processor 1102 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1102 may be multiple separate processors located on separate integrated circuit chips. In some embodiments processor 1102 may be a processor having integrated graphics, while in other embodiments processor 1102 may be a graphics core or cores.

Figure 12:
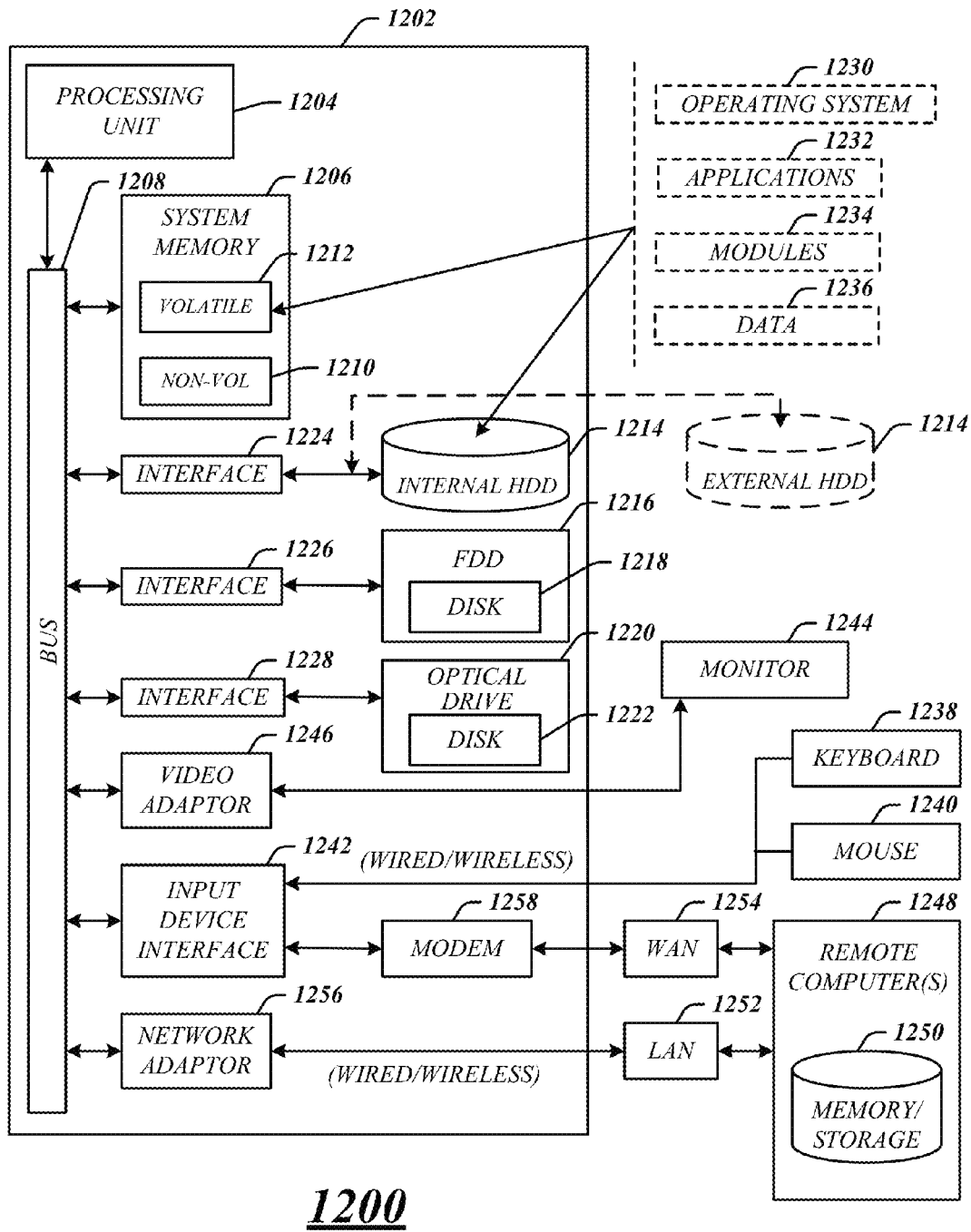
FIG. 12 illustrates one embodiment of a computing architecture.

FIG. 12 illustrates an embodiment of an exemplary computing system (architecture) 1200 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1200 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1200 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors. Dual microprocessors and other multi processor architectures may also be employed as the processing unit 1204. The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures.

The computing architecture 1200 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236.

A user can enter commands and information into the computer 1202 through one or more wire/wireless input devices, for example, a keyboard 1238 and a pointing device, such as a mouse 1240. Other input devices may include a microphone, an infra-red (IR) remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1294 serial port, a game port, a USB port, an IR interface, and so forth.

A monitor 1244 or other type of display device is also connected to the system bus 1208 via an interface, such as a video adaptor 1246. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless terminal, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a communication interface;
a processor circuit; and
a location analyzing module operable on the processor circuit to:
receive a first set of location information including a first radio information item from a single-radio wireless terminal via the communication interface, the first radio information item to comprise an uplink time difference of arrival (u-TDOA) measurement for the single-radio wireless terminal;
scan a location database to identify a second radio information item matching the first radio information item, the second radio information item to comprise a second u-TDOA measurement, the location database comprising one or more location entries and identifying, for each location entry, a plurality of corresponding radio measurements identified based on multi-radio measurements received in one or more location information messages from one or more multi-radio wireless terminals; and
index the second radio information item to a location entry in the location database to determine a refined location for the single-radio wireless terminal.

2. The apparatus of claim 1, the location database comprising a multiplicity of radio information including one or more of:
a wireless wide area network (WWAN) received signal strength indicator (RSSI);
a WiFi RSSI; and
global positioning sensor (GPS) information.

3. The apparatus of claim 1, comprising a response processing module operable on the processor circuit to:
determine whether the first set of location information is associated with a request for location information;
provide the refined location for return to the single-radio wireless terminal when the first set of location information is associated with a request for location information; and
provide the first set of location information for storage when not associated with a request for location information.

4. The apparatus of claim 1, the location analyzing module operable on the processor circuit to:
calculate an accuracy of the refined location; and
provide the calculated accuracy for transmission to the single-radio wireless terminal.

5. The apparatus of claim 1, the location analyzing module operable of the processing circuit to:
compare a value of the first radio information item to a value of the second radio information item;
identify a location entry in the location database corresponding to the second radio information item when an exact match between is found between the first and second radio information item; and
provide the location entry as the refined location.

6. The apparatus of claim 5, the location analyzing module operable of the processing circuit to:
determine an approximate location value based upon one or more radio information entries in the location database providing a substantial match to the first radio information item; and
provide the approximate location value as the refined location.

7. The apparatus of claim 1, comprising a response processing module operable on the processor circuit to
search a service database for service locations for a requested service; and
select a location based service (LBS) item by identifying a service location that substantially matches the refined location estimate; and provide the LBS item for sending to the single-radio wireless terminal.

8. The apparatus of claim 1, comprising a magnetic storage device coupled to the communication interface to store the location information.

9. At least one non-transitory computer-readable storage medium comprising instructions that, when executed, cause a system to:
receive a first set of location information including a first radio information item from a single-radio wireless terminal, the first radio information item to comprise an uplink time difference of arrival (u-TDOA) measurement for the single-radio wireless terminal;
scan a location database to identify a second radio information item matching the first radio information item, the second radio information item to comprise a second u-TDOA measurement, the location database comprising one or more location entries and identifying, for each location entry, a plurality of corresponding radio measurements identified based on multi-radio measurements received in one or more location information messages from one or more multi-radio wireless terminals; and
index the second radio information item to a location entry in the location database to determine a refined location for the single-radio wireless terminal.

10. The at least one non-transitory computer-readable storage medium of claim 9, comprising instructions that when executed cause the system to:
determine whether the first set of location information is associated with a request for location information;
provide the refined location for return to the single-radio wireless terminal when the first set of location information is associated with a request for location information; and
provide the first set of location information for storage when not associated with a request for location information.

11. The at least one non-transitory computer-readable storage medium of claim 9, comprising instructions that when executed cause the system to:
calculate an accuracy of the refined location; and
provide the calculated accuracy for transmission to the single-radio wireless terminal.

12. The at least one non-transitory computer-readable storage medium of claim 9, comprising instructions that when executed cause the system to:
compare a value of the first radio information item to a value of the second radio information item;
identify a location entry in the location database corresponding to the second radio information item when an exact match between is found between the first and second radio information item; and
provide the location entry as the refined location.

13. The at least one non-transitory computer-readable storage medium of claim 9, comprising instructions that when executed cause the system to:
determine an approximate location value based upon one or more radio information entries in the location database providing a substantial match to the first radio information item; and
provide the approximate location value as the refined location.

14. The at least one non-transitory computer-readable storage medium of claim 9, comprising instructions that when executed cause the system to:
search a service database for service locations for a requested service; and
select an LBS service item by identifying a service location that substantially matches the refined location estimate; and
provide the LBS service item for sending to the single-radio wireless terminal.

15. A method, comprising:
receiving a first radio information item from a single-radio wireless terminal, the first radio information item to comprise an uplink time difference of arrival (u-TDOA) measurement for the single-radio wireless terminal;
scanning a location database to determine a stored radio information item whose value matches that of the first radio information item, the second radio information item to comprise a second u-TDOA measurement, the location database comprising one or more location entries and identifying, for each location entry, a plurality of corresponding radio measurements identified based on multi-radio measurements received in one or more location information messages from one or more multi-radio wireless terminals; and
determining a refined location for the single-radio wireless terminal based on a location entry in the location database corresponding to the stored radio information item.

16. The method of claim 15, the location database comprising a multiplicity of radio information including one or more of:
a wireless wide area network (WWAN) received signal strength indicator (RSSI);
a WiFi RSSI; and
global positioning sensor (GPS) information.

17. The method of claim 15, comprising:
determining whether the first radio information item is accompanied by a request for location information;
providing the refined location for return to the single-radio wireless terminal when the first radio information item is accompanied by a request for location information; and
providing the first radio information item for storage when the first radio information is not accompanied by a request for location information.

18. The method of claim 15, comprising:
identifying a location entry in the location database indexed to the second item of radio information when an exact match is found; and
providing the location entry as the refined location.

19. The method of claim 15, comprising:
searching a service database for service locations for a requested service; and
selecting an LBS service item by identifying a service location that most closely matches the refined location estimate; and
providing the LBS service item for sending to the single-radio wireless terminal.

* * * * *